US012612999B2

(12) United States Patent
Shim et al.

(10) Patent No.: US 12,612,999 B2
(45) Date of Patent: Apr. 28, 2026

(54) INTEGRATED AND MOBILE AUTOMATIC HYDROGEN STATION

(71) Applicant: BTE INC., Hwaseong-si (KR)

(72) Inventors: Gyu Jung Shim, Uiwang-si (KR); Chul Bae Lee, Gwangju-si (KR)

(73) Assignee: BTE INC., Hwaseong-si (KR)

( * ) Notice: Subject to any disclaimer, the term of this patent is extended or adjusted under 35 U.S.C. 154(b) by 156 days.

(21) Appl. No.: 18/284,516

(22) PCT Filed: Apr. 6, 2022

(86) PCT No.: PCT/KR2022/004962
§ 371 (c)(1),
(2) Date: Sep. 27, 2023

(87) PCT Pub. No.: WO2022/216050
PCT Pub. Date: Oct. 13, 2022

(65) Prior Publication Data

US 2024/0159356 A1 May 16, 2024

(30) Foreign Application Priority Data

Apr. 7, 2021 (KR) ........................ 10-2021-0045281

(51) Int. Cl.
*F17C 5/00* (2006.01)
*F17C 5/06* (2006.01)
*F17C 13/02* (2006.01)

(52) U.S. Cl.
CPC ................ *F17C 5/007* (2013.01); *F17C 5/06* (2013.01); *F17C 13/025* (2013.01);
(Continued)

(58) Field of Classification Search
CPC .......... F17C 5/007; F17C 5/06; F17C 13/025; F17C 13/026; F17C 2205/0326;
(Continued)

(56) References Cited

U.S. PATENT DOCUMENTS

2004/0042957 A1* 3/2004 Martin .................. C01B 3/0005 423/644
2007/0042241 A1* 2/2007 Matsuo ................. C01B 3/0005 429/444

(Continued)

FOREIGN PATENT DOCUMENTS

CN 112413399 A * 2/2021
KR 10-2009-0115719 A 11/2009

(Continued)

OTHER PUBLICATIONS

CN 112413399 A- English Translation (Year: 2021).*

*Primary Examiner* — Christopher M Afful

(74) *Attorney, Agent, or Firm* — Bridgeway IP Law Group, PLLC; Sang Ho Lee; Hyun Woo Shin

(57) ABSTRACT

Proposed is an apparatus for supplying hydrogen to various mobility products using hydrogen as fuel, that is, a hydrogen station. An integrated and mobile automatic hydrogen station achieves miniaturization by increasing space efficiency by adopting a structure that can supply high-pressure hydrogen directly from a hydrogen generating source without having a hydrogen storage tank so as to facilitate movement to sites operating hydrogen-fueled mobility products and ensure the airtightness of a gas supply path at the same time, and measures physical state variables such as pressure and temperature of gas being supplied in real time and automatically controls a supply process on the basis of the measurement so as to increase gas filling efficiency while improving safety and user convenience of a filling process.

8 Claims, 4 Drawing Sheets

(52) U.S. Cl.
CPC .... *F17C 13/026* (2013.01); *F17C 2205/0326* (2013.01); *F17C 2221/012* (2013.01); *F17C 2223/036* (2013.01); *F17C 2227/0348* (2013.01); *F17C 2250/032* (2013.01)

(58) Field of Classification Search
CPC .......... F17C 2221/012; F17C 2223/036; F17C 2227/0348; F17C 2250/032
USPC .......... 141/4
See application file for complete search history.

(56) References Cited

U.S. PATENT DOCUMENTS

| | | | | |
|---|---|---|---|---|
| 2009/0007705 | A1* | 1/2009 | McLean | G01G 17/04 206/0.6 |
| 2009/0226776 | A1* | 9/2009 | Kim | C25B 1/55 429/515 |
| 2012/0111447 | A1* | 5/2012 | Mori | F17C 3/025 141/82 |
| 2012/0318406 | A1* | 12/2012 | Cajiga | E04H 1/1233 141/98 |
| 2015/0053274 | A1* | 2/2015 | Gordon | G01F 1/34 137/557 |
| 2020/0171945 | A1* | 6/2020 | McNicholas | B60K 28/10 |
| 2022/0196210 | A1* | 6/2022 | Watanabe | F17C 5/06 |

FOREIGN PATENT DOCUMENTS

| | | | |
|---|---|---|---|
| KR | 10-2011-0077659 | A | 7/2011 |
| KR | 10-1633568 | B1 | 6/2016 |
| KR | 10-2017-0066587 | A | 6/2017 |
| KR | 10-1890300 | B1 | 9/2018 |
| KR | 10-2020-0133471 | A | 11/2020 |

* cited by examiner

[FIG. 1]
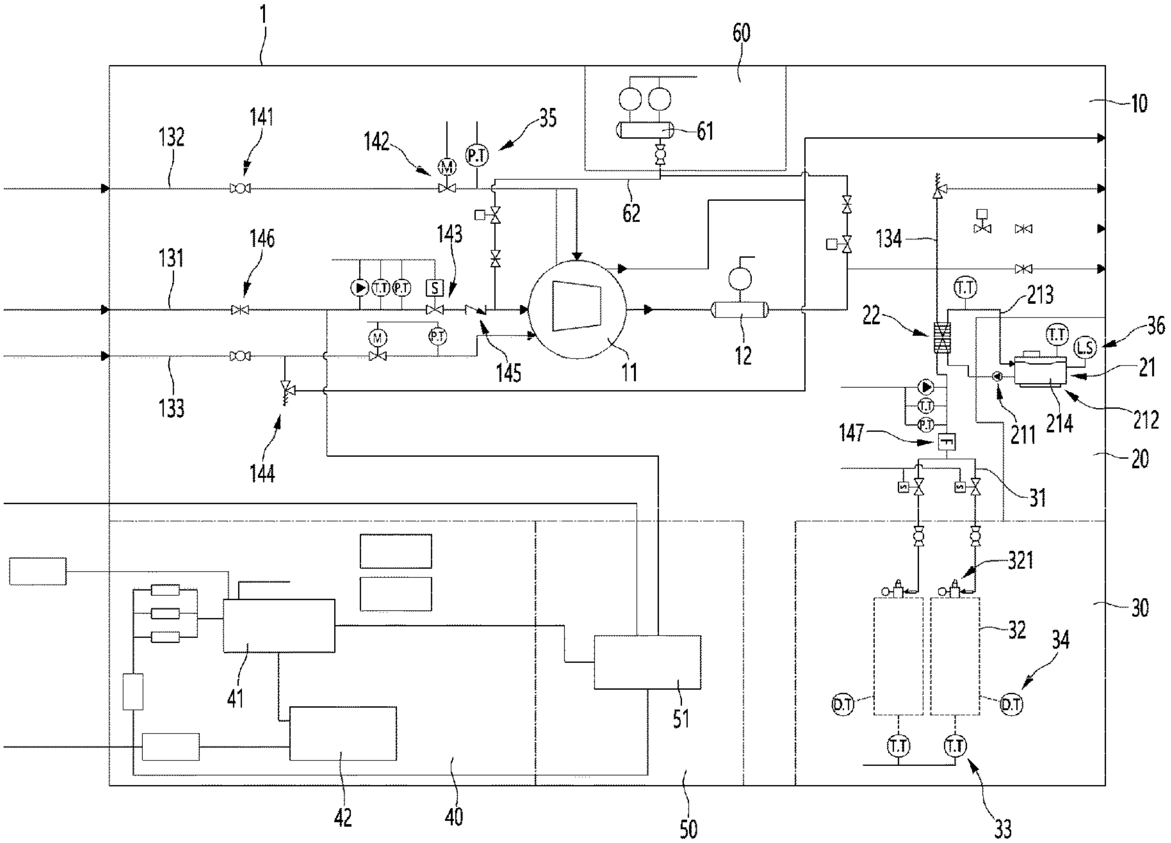

[FIG.2]
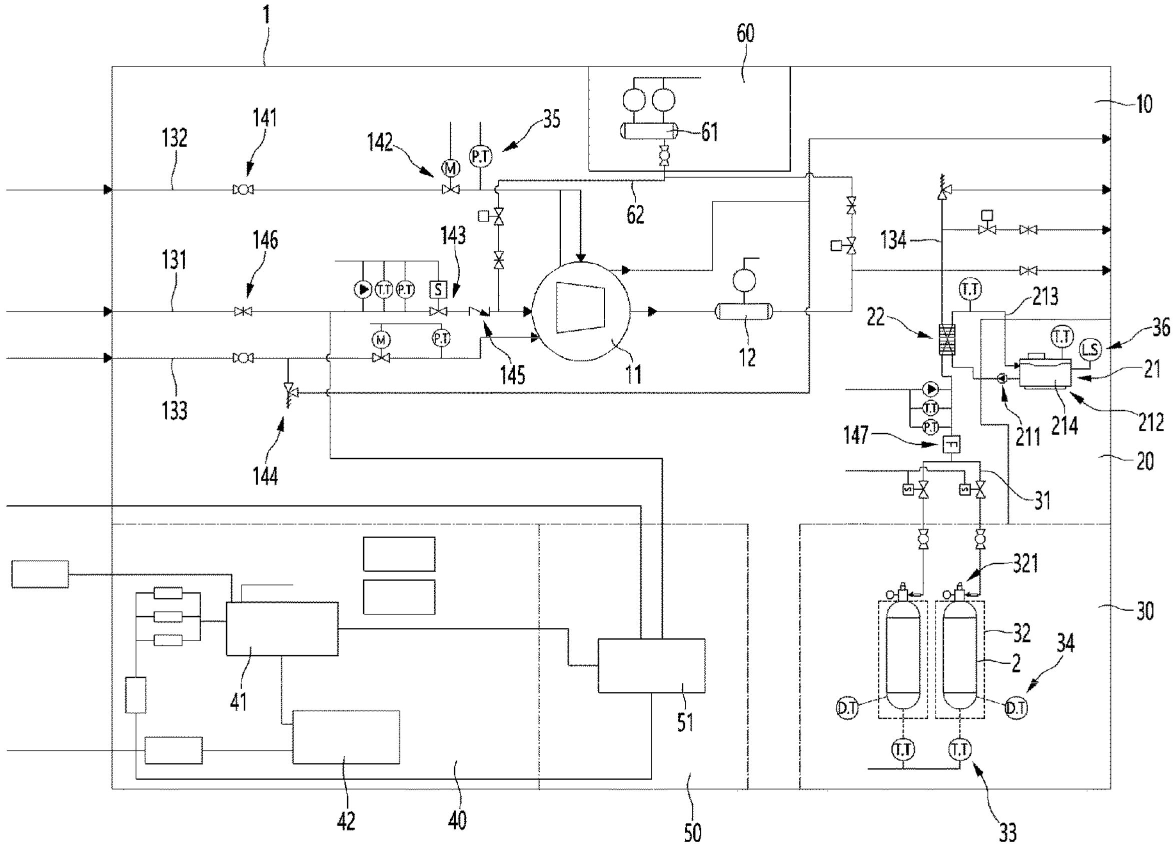

[FIG.3]
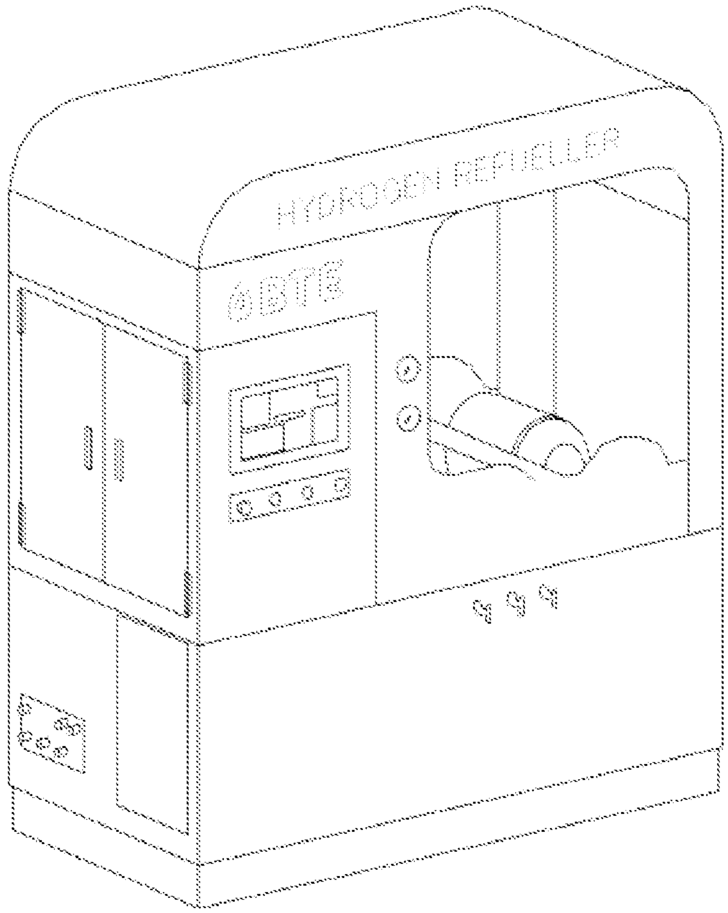

[FIG.4]
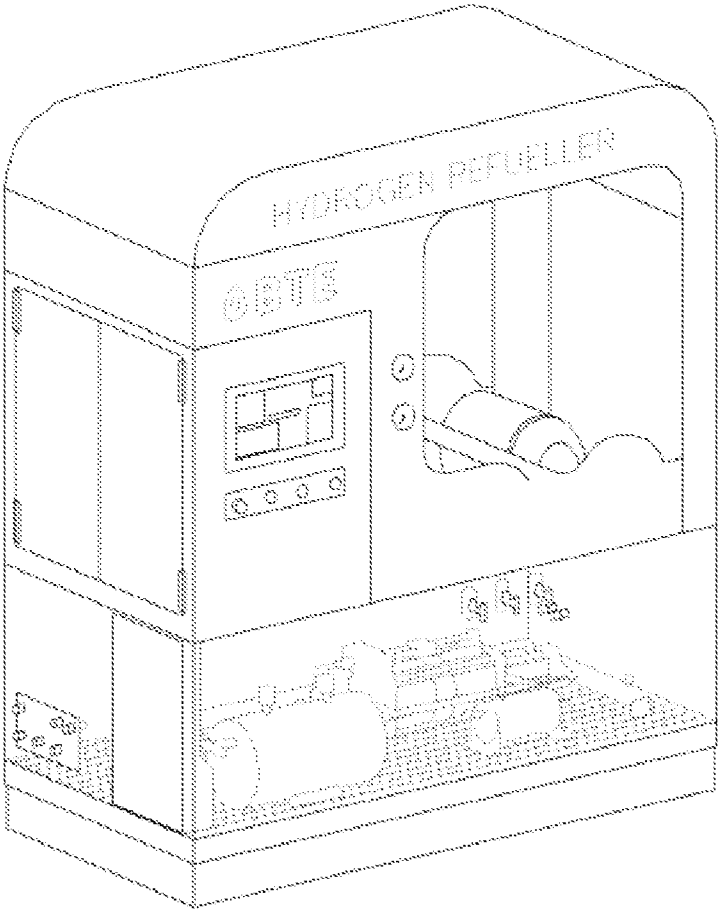

INTEGRATED AND MOBILE AUTOMATIC HYDROGEN STATION

CROSS-REFERENCE TO RELATED APPLICATIONS

This application claims the benefit under 35 U.S.C. section 371, of PCT International Application No.: PCT/KR2022/004962, filed on Apr. 6, 2022, which claims foreign priority to Korean Patent Application No.: KR10-2021-0045281, filed on Apr. 7, 2021, in the Korean Intellectual Property Office, both of which are hereby incorporated by reference in their entireties.

TECHNICAL FIELD

The present disclosure relates to an apparatus, that is, a hydrogen station for supplying hydrogen to various mobility products using hydrogen as fuel. An integrated and mobile automatic hydrogen station achieves miniaturization by increasing space efficiency by adopting a structure that can supply high-pressure hydrogen directly from a hydrogen generating source without having a hydrogen storage tank so as to facilitate movement to sites where hydrogen-fueled mobility products are operated and ensure the airtightness of a gas supply path at the same time, and measures physical state variables such as pressure and temperature of gas being supplied in real time, and automatically controls a supply process on the basis of the measurement so as to increase gas filling efficiency while improving safety and user convenience of a filling process.

BACKGROUND ART

Hydrogen is defined as the first element of the periodic table. It is an element with the simplest structure consisting of one proton and one electron and is the most common element in the universe, representing 75% of the total mass of the universe. Hydrogen exists mainly in the form of H2 molecules in nature, and due to its chemical properties, hydrogen exists in a gaseous state under ordinary conditions. In general, hydrogen gas can be easily collected by electrolyzing water (H2O) or by reacting organic substances under catalytic conditions. In addition, a huge amount of hydrogen is generated as a by-product in the petrochemical process, and thus it can be easily utilized.

Hydrogen energy uses energy released when hydrogen reacts with oxygen, and a representative example of the hydrogen energy is a fuel cell. A hydrogen fuel cell is a power generation system that produces electricity and heat energy through electrochemical reactions between hydrogen and oxygen. Hydrogen fuel cells produce electricity directly without going through the energy conversion process through fuel combustion, resulting in low energy loss and high power generation efficiency. For example, while the utilization efficiency of electrical energy produced by power plants is 35%, the overall energy efficiency of fuel cells using hydrogen energy is approximately 80%. Furthermore, in the case of hydrogen, since the only by-product derived from the energy generation process is pure water, it is very environmentally friendly compared to existing fossil fuel-based energy generation processes. In addition, unlike fossil fuels, which have severe regional differences in reserves, hydrogen can be sufficiently supplied domestically and replace imported energy sources, boasting excellent economic utility.

However, since hydrogen is very light in nature, the storage density per unit volume of hydrogen is very low, and hydrogen is difficult to handle because it is a flammable gas. In order to solve this problem, hydrogen needs to be handled under high pressure conditions or in the form of liquefied hydrogen, and handling standards are also strict to ensure safety. This inevitably leads to the enlargement and complexity of hydrogen energy-related facilities and infrastructure, resulting in problems with economic feasibility, convenience, and accessibility. Moreover, due to the difficulties in handling hydrogen, a certain level of knowledge and various manual operation capabilities are required of general users who handle hydrogen, causing inconveniences in use.

PATENT DOCUMENT

Korean Patent Application Publication No. 10-2017-0066587 (published Jun. 14, 2017) "HYDROGEN STATION"

Although the document discloses technology for a hydrogen refueling device with improved mobility, the configuration to ensure safety is only a typical configuration, and a significant portion of the refueling process relies on manual operation by protocol, making it cumbersome to use.

DISCLOSURE

Technical Problem

The present disclosure has been made keeping in mind the problems occurring in the related art.

An objective of the present disclosure is to provide a hydrogen station for hydrogen supply that is easy to move to sites where hydrogen fuel mobility products are operated, the products being difficult to leave the site, such as hydrogen-fueled industrial equipment, or required to be operated only within a specific facility, such as hydrogen-fueled military equipment or hydrogen forklifts.

An objective of the present disclosure is to provide a hydrogen station for hydrogen supply that allows safe hydrogen refueling even in sites where it is difficult to meet the safety standards applied to general hydrogen refueling stations.

An objective of the present disclosure is to provide a hydrogen station for hydrogen supply that allows safe hydrogen refueling even in environments where it is difficult to secure the large area, facility standards, and operating personnel that a typical hydrogen refueling station should have.

An objective of the present disclosure is to provide a hydrogen station for hydrogen supply that fundamentally eliminates the possibility of safety accidents that may occur due to user carelessness or manufacturing defects.

An objective of the present disclosure is to provide a hydrogen station for hydrogen supply that allows a user to easily perform refueling without having a certain level of knowledge about hydrogen refueling or being familiar with manual operation techniques.

An objective of the present disclosure is to provide a hydrogen station for hydrogen supply that efficiently and safely refuels multiple applications at the same time, and further enables refueling of various types of applications simultaneously.

An objective of the present disclosure is to produce hydrogen simply by supplying power to an apparatus in industrial sites where hydrogen supply and procurement are difficult, while simultaneously supplying high or low pressure hydrogen gas.

Technical Solution

In order to achieve the above mentioned objectives, the present disclosure is implemented by an embodiment having the following configuration.

According to an embodiment of the present disclosure, there is provided an integrated and mobile automatic hydrogen station including: a hydrogen pressurizing unit configured to compress and accommodate hydrogen gas; a cooling unit configured to cool the hydrogen gas; a refueling unit configured to receive hydrogen gas from the hydrogen pressurizing unit and provides the received hydrogen gas to a user; and a control unit configured to control a hydrogen refueling process in the hydrogen pressurizing unit, the cooling unit, and the refueling unit.

According to another embodiment of the present disclosure, in the integrated and mobile automatic hydrogen station, the hydrogen pressurizing unit may include a gas guide line, a gas booster, and a buffer tank.

According to still another embodiment of the present disclosure, in the integrated and mobile automatic hydrogen station, the gas guide line may consist of an air guide line, a hydrogen guide line, and a nitrogen guide line, wherein each of the air guide line, the hydrogen guide line, and the nitrogen guide line may have, on a guide path thereof, a valve and a pressure sensor electrically connected to the control unit.

According to still another embodiment of the present disclosure, in the integrated and mobile automatic hydrogen station, the cooling unit may include a cooling water tank and a heat exchange part, wherein the cooling water tank may be characterized in that a Peltier element is formed.

According to still another embodiment of the present disclosure, in the integrated and mobile automatic hydrogen station, the refueling unit may include: a receiving part configured to accommodate a user's hydrogen refueling container; a temperature measurement part; and a distance measurement part.

According to still another embodiment of the present disclosure, in the integrated and mobile automatic hydrogen station, the receiving part may be provided in plurality, wherein on a side of each of the plurality of the receiving parts, a receiving guide line may be formed to guide hydrogen gas supplied from the hydrogen guide line into the hydrogen refueling container, and a valve electrically connected to the control unit may be provided on a guide path of each receiving guide line.

According to still another embodiment of the present disclosure, in the integrated and mobile automatic hydrogen station, the temperature measurement part may measure a temperature of the supplied hydrogen gas by observing the hydrogen refueling container in infrared rays.

According to still another embodiment of the present disclosure, in the integrated and mobile automatic hydrogen station, the distance measurement part may measure a position of a surface of the hydrogen refueling container using electromagnetic waves.

Advantageous Effects

The present disclosure has the following effects by employing the technical solutions disclosed above.

The present disclosure can achieve miniaturization of an apparatus by increasing space efficiency by adopting a structure that can supply high-pressure hydrogen directly from a hydrogen generating source without having a hydrogen storage tank so as to facilitate movement, can be free from the safety problems associated with providing a hydrogen storage tank since the present disclosure does not require a separate hydrogen storage tank, and can allow refueling by easily moving the apparatus to sites where hydrogen fuel mobility products are operated, the products being difficult to leave the site, such as hydrogen-fueled industrial equipment, or required to be operated only within a specific facility, such as hydrogen-fueled military equipment. Furthermore, the present disclosure can allow safe hydrogen refueling even in sites where it is difficult to meet the safety standards applied to general hydrogen refueling stations.

The present disclosure can fundamentally eliminate the possibility of safety accidents that may occur due to user carelessness or manufacturing defects by ensuring the airtightness of a gas guide line and measuring physical state variables such as pressure and temperature of gas being supplied in real time to automatically control a supply process on the basis of the measurement, and can allow a user to easily perform refueling without having a certain level of knowledge about hydrogen refueling or being familiar with manual operation techniques.

The present disclosure can additionally ensure safety against the risk of overpressure and explosion that may occur due to errors in a temperature and pressure sensor of the gas guide line by measuring physical state variables such as temperature and displacement on the surface of an application hydrogen container being charged in real time and automatically controlling the gas supply process on the basis of the measurement. Thus, the present disclosure can provide significantly improved effects compared to existing inventions in refueling small and medium-sized hydrogen mobilities using a detachable hydrogen container.

The present disclosure can enable simultaneous refueling of multiple applications efficiently, simply, and safely, regardless of the type of application by maintaining the same and constant pressure of hydrogen gas supplied to a plurality of receiving parts, automatically detecting and measuring the volume of a user's hydrogen refueling container accommodated in the receiving parts, and automatically controlling the supply of hydrogen gas on the basis of the measurement.

DESCRIPTION OF DRAWINGS

FIG. 1 is a configuration diagram of an integrated and mobile automatic hydrogen station according to the present disclosure;

FIG. 2 is a configuration diagram showing a state in which a user's hydrogen refueling container is fastened to a refueling unit in the integrated and mobile automatic hydrogen station according to the present disclosure;

FIG. 3 is a conceptual diagram showing a prototype of the integrated and mobile automatic hydrogen station according to the present disclosure; and FIG. 4 is a conceptual diagram showing the internal configuration of the prototype of the integrated and mobile automatic hydrogen station according to the present disclosure.

BEST MODE

Hereinafter, preferred embodiments of an integrated and mobile automatic hydrogen station according to the present disclosure will be described in detail with reference to the attached drawings. In the following description of the present disclosure, if a detailed description of a known function or configuration is judged to unnecessarily obscure the gist of the present disclosure, the detailed description will be omitted. Throughout the specification, when a part "comprises (includes)" a certain component, this does not mean that other components are excluded, but that other components may be further included, unless specifically stated to the contrary. In addition, terms such as " . . . unit" usen in the specification refer to a unit that processes at least one function or operation, and may be implemented as hardware, software, or a combination of hardware and software.

An integrated and mobile automatic hydrogen station according to an embodiment of the present disclosure will be described with reference to FIGS. 1 and 2. The hydrogen station 1 includes: a hydrogen pressurizing unit 10 that compresses and accommodates low-pressure hydrogen gas; a cooling unit 20 that cools the hydrogen gas compressed in the hydrogen pressurizing unit; a refueling unit 30 that receives hydrogen gas from the hydrogen pressurizing unit and provides hydrogen gas to a user who wishes to refuel; and a control unit 40 that controls a hydrogen refueling process in the hydrogen pressurizing unit 10, cooling unit 20, and refueling unit 30. The overall configuration including the above components of the hydrogen station 1 is shown in FIGS. 3 and 4, and although it is preferable that the hydrogen station 1 is configured as an integrated unit as shown in FIGS. 3 and 4 to facilitate transportation and loading and unloading, this is only an example, and the present disclosure is not necessarily limited to the configuration shown in FIGS. 3 and 4.

The hydrogen pressurizing unit 10 may include: a gas guide line, which is the path through which gas moves; a gas booster that compresses the supplied gas 11; and a buffer tank 12 that temporarily accommodates the high-pressure hydrogen gas discharged from the gas booster 11.

The gas guide line may include an air guide line 132, a hydrogen guide line 131; and a nitrogen guide line 133. The air guide line 132 receives air from the outside and supplies the air to the gas booster 11. The hydrogen guide line 131 guides the supplied hydrogen gas to the gas booster 11, and directs the high-pressure hydrogen gas compressed in the gas booster 11 to the refueling unit 30 through the cooling unit 20. The hydrogen guide line 131 may receive hydrogen gas from the outside, may be supplied with hydrogen gas from a water electrolysis unit to be explained in another embodiment below, or may be supplied with hydrogen gas from a hydrogen storage tank part to be explained in still another embodiment below. The nitrogen guide line 133 guides the supplied nitrogen gas to the gas booster 11.

The gas booster 11 compresses the hydrogen supplied from the hydrogen guide line 131. The gas booster 11 preferably performs gas compression in a piston manner, but is not necessarily limited thereto. Due to the compression process performed in the gas booster 11, the hydrogen gas may preferably be compressed within a pressure range of 1 to 750 bar, which allows hydrogen gas to be smoothly refueled into a hydrogen container with 350 bar pressure or with 700 bar pressure currently in circulation.

The gas booster 11 is driven by air supplied from the air guide line 132. Thus, the amount of supplied air determines the boosting speed in the gas booster 11, which is ultimately directly related to the hydrogen refueling speed. Therefore, in order to control the supply amount of air, it is preferable that a motorized valve 142 and a pressure sensor are provided on the air guide line 132. The motorized valve 142 is a type of ball valve 141 that controls opening and closing with electrical signals, and is electrically connected to the control unit 40. The control unit 40 automatically controls the compression process performed in the gas booster 11 by controlling the opening and closing of the motorized valve 142 on the basis of the air pressure value on the air guide line 132 measured from the pressure sensor, and furthermore, controls the start, end, and refueling speed of the refueling process. The air guide line 132 may further have a general ball valve 141 formed on the guide line, and as a result, the stability and safety of the apparatus may be guaranteed by manually controlling the air supply in preparation for the occurrence of electrical errors in the air supply process described above.

The nitrogen gas is supplied for a flushing process in the gas booster 11. For this purpose, the nitrogen guide line 133 supplies the nitrogen gas to the gas booster 11, and as in the case of the air guide line 132, the nitrogen guide line 133 is preferably provided with a motorized valve 142 and a pressure sensor electrically connected to the control unit 40, which may prevent meaningless waste of nitrogen gas and fundamentally prevent safety accidents caused by leakage by controlling the amount of nitrogen flowing into the gas booster 11 and automatically blocking additional supply of nitrogen gas even in situations where a user leaves without stopping the nitrogen supply after performing the refueling process. The nitrogen guide line 133 may further have a general ball valve 141 provided thereon, so that the supply of nitrogen gas may be manually adjusted in preparation for the situation where an electrical error occurs in the nitrogen gas supply process described above, ensuring stability and safety of the apparatus.

The nitrogen guide line 133 may further have a pressure relief valve 144 formed on the guide path thereof. The pressure relief valve 144 allows excess nitrogen gas to be discharged through a separate guide path when the nitrogen gas pressure value of the nitrogen guide line 133 exceeds the preset reference value, thereby ensuring the stability of the apparatus even when nitrogen gas is supplied above the normal pressure range due to user error or electrical error.

The hydrogen guide line 131 may be provided with a solenoid valve 143, a pressure sensor, and a temperature sensor electrically connected to the control unit 40 on a path that guides hydrogen gas to the gas booster 11, and as in the case of the nitrogen guide line 133, may automatically control the amount of hydrogen flowing into the gas booster 11, and may be further provided with a pressure gauge so that the supply pressure of hydrogen may be checked with the naked eye, making it easy for a user or manager to respond when an abnormal situation occurs. In addition, a backflow preventer 145 may be further provided at the final end of the path leading to the gas booster 11, and due to this, the high-pressure hydrogen gas compressed in the gas booster is prevented from flowing back into the hydrogen guide line 131 located on the path leading to the gas booster 11, ensuring mechanical stability.

The buffer tank 12 is preferably located on the path through which compressed hydrogen gas is discharged from the gas booster 11, is formed to temporarily store the discharged high-pressure hydrogen gas while maintaining a constant pressure and then discharge the hydrogen gas through the path toward the refueling unit 30, and is formed to prevent overpressure of hydrogen gas that may occur when the gas booster 11 compresses hydrogen gas in a piston manner and discharges the compressed hydrogen gas. It is desirable that the buffer tank 12 be formed with a capacity of less than one-tenth of a hydrogen container to be refueled, discharge the previously stored hydrogen gas without continuously storing the previously stored hydrogen gas after the hydrogen refueling process is completed. The buffer tank 12 is preferably built inside the apparatus, but is not limited thereto. By adopting the configuration and coupling relationship of the buffer tank 12 described above, hydrogen gas may maintain a constant pressure without any additional components such as a separate hydrogen storage tank, contributing to miniaturization and mobility of the apparatus.

During the refueling process, the high-pressure hydrogen gas discharged from the buffer tank 12 is directed to the cooling unit 20 along the hydrogen guide line 131. After the refueling process is completed, discharge is made through a discharge guide line 134 provided on the guide path. It is preferable that a solenoid valve 143 and a needle valve 146 are provided in the discharge guide line 134, and a pressure relief valve 144 is further provided in the discharge guide line 134 to automatically and safely control the discharge process. An additional guide line may be formed on the discharge guide line 134, which may be used for various purposes such as testing, but is not limited thereto.

The cooling unit 20 cools the high-pressure hydrogen gas discharged from the gas booster 11. To be specific, it is preferable to cool the high-pressure hydrogen gas to below 25° C., and more preferably, the high-pressure hydrogen gas is cooled to below 15° C. In general, it is widely known in the art that safety problems may occur when the temperature of hydrogen gas exceeds about 35° C. when refueling hydrogen gas, and related laws and regulations limit the refueling temperature of hydrogen gas to within 35° C. In the case of sites where the apparatus must be operated outdoors, the temperature at the site may exceed 35° C. depending on seasonal or time of day factors. Thus, cooling and maintaining the high pressure hydrogen gas within the above temperature range is necessary.

To this end, the cooling unit 20 includes a cooling water tank 21 and a heat exchange part 22. In the heat exchange part 22, indirect heat exchange is performed by indirectly contacting a coolant 214 guided from the cooling water tank 21 and the high-temperature hydrogen gas guided from the gas booster 11. The configuration for performing the contact process may be a known configuration, and any configuration for this purpose is not particularly limited.

The cooling water tank 21 is characterized in that a Peltier element 212 is formed. The Peltier element 212 refers to a device that can indirectly perform heat exchange using heat transfer by the Peltier effect. The Peltier element 212 is preferably provided to be attached to the cooling water tank 21, but the attachment form is not particularly limited. The Peltier element 212 maintains cooling water 214 inside the cooling water tank 21 at a temperature preferably below 15° C. The cooling water tank 21 may be further provided with: a cooling water line 213 that guides the cooling water 214 to circulate in the cooling water tank 21 and the heat exchange part 22; a temperature sensor for measuring the temperature of the cooling water 214; a water level measurement sensor 36 to measure the level of the cooling water 214 inside the cooling water tank 21; and a cooling water pump 211 for circulating flow inside the cooling water line 213.

An example of a cooling process according to an embodiment of the present disclosure will be described. First, when a user starts refueling hydrogen gas, the cooling water 214 in the cooling water tank 21 is maintained at a constant temperature, preferably below 15° C. Refueling may be started even if the cooling water 214 is not within the above temperature range. Even if the temperature of the cooling water 214 rises above 35° C. during refueling, the temperature sensor for measuring the temperature of the cooling water detects the temperature rise, and the control unit 40 temporarily stops the refueling operation, waits for the temperature of the cooling water 214 to drop, and then performs the refueling process again. In the refueling process, hydrogen gas is guided toward the refueling unit 30 with temperature thereof increased due to the compression process performed in the gas booster 11. At this time, while passing through the hydrogen guide line 131 passing through the heat exchange part 22, the high-temperature hydrogen gas contacts the cooling water 214 passing through the cooling water line 213 in contact with the hydrogen guide line 131 in the heat exchange part 22, and thus the cooling is carried out through indirect heat exchange in which heat exchange occurs. By employing an indirect heat exchange method using the coupling relationship between the above components, the airtightness of the hydrogen guide line 131 through which the hydrogen gas being cooled passes is ensured, fundamentally preventing workplace accidents that may occur due to refrigerant mixing into the hydrogen guide line 131, and implementing the heat exchange process using a more economical and simple technology.

The high-pressure hydrogen gas cooled through the cooling process in the cooling unit 20 reaches a filter part 147 located at the final end of the hydrogen guide line 131, and a pressure sensor, temperature sensor, and pressure gauge are further formed on the hydrogen guide line 131 from the cooling unit 20 to the filter part 147 so that ultimately, the temperature and pressure of the hydrogen gas may be measured and abnormal situations may be responded to when they occur.

The refueling unit 30 includes: a receiving part 32 for accommodating a user's hydrogen refueling container 2; a temperature measurement part 33 for measuring the temperature of hydrogen gas supplied to the user's hydrogen refueling container 2; a distance measurement part 34 for measuring the surface displacement of the user's hydrogen refueling container 2. On one side of the receiving part 32, a receiving guide line 31 is formed to supply the hydrogen gas that has passed through the filter part 147 to the user's hydrogen refueling container 2, and the receiving guide line 31 may have, on the guide path thereof, a manually operated ball valve 141 and a solenoid valve 143 electrically connected to the control unit 40. Thus, as described in the description of the hydrogen pressurizing unit 10, the supply of cooled high-pressure hydrogen gas supplied to the refueling unit 30 may be automatically controlled by means of the control unit 40.

A plurality of receiving parts 32 may be provided. When the plurality of receiving parts 32 are provided, each receiving part 32 includes a receiving guide line 31 formed on one side of the each receiving part 32, and each receiving guide line 31 may have, on the guide path thereof, a ball valve 141 and a solenoid valve 143. Due to this, when the refueling process is performed only in some of the receiving parts 32 among the plurality of receiving parts 32, the control unit 40 may automatically control the cooled high-pressure hydrogen gas to be supplied only to some of the receiving parts 32 where the refueling process is being performed and not to the remaining receiving parts 32. When the refueling process is performed simultaneously in the plurality of receiving parts 32, the control unit 40 may automatically control the supply of hydrogen gas to each receiving part 32 where the refueling process is in progress while maintaining the pressure balance of the hydrogen gas. When refueling hydrogen gas for multiple applications simultaneously with an existing hydrogen refueling device, the pressure of hydrogen gas supplied to each application is often not the same due to mechanical defects, etc. However, in the case of the refueling unit 30 according to the embodiment of the present disclosure, by employing the above configuration and coupling relationship, the pressure of the supplied hydrogen gas may be kept the same and constant even if multiple refueling processes are performed simultaneously. In addition, even when an unexpected failure occurs in some of the receiving parts 32 among the plurality of receiving parts 32, a flexible response is possible.

The receiving part 32 has a fastening device 321 provided on one side thereof. The fastening device 321 fastens and secures the user's hydrogen refueling container 2 on one side, and is connected to the receiving guide line 31 on the other side, so that cooled high-pressure hydrogen gas guided from the receiving guide line 31 is supplied to the user's hydrogen refueling container 2 with the user's hydrogen refueling container 2 fastened and fixed. A pressure sensor is further provided in the fastening device 321 to measure the pressure of the cooled high-pressure hydrogen gas that is finally supplied.

The temperature measurement part 33 measures the temperature of hydrogen gas supplied to the user's hydrogen refueling container 2. Preferably, the temperature measurement part 33 is formed to be spaced apart from the receiving part 32 and is electrically connected to the control unit 40. The temperature measurement part 33 is spaced apart from the user's hydrogen refueling container 2 and measures the temperature of the hydrogen gas supplied to the user's hydrogen refueling container 2 by observing the surface of the user's hydrogen refueling container 2 in the infrared range. Thus, during the refueling process, when the surface temperature of the user's hydrogen refueling container 2 observed in the infrared region by the temperature measurement part 33 deviates from the reference range, the control unit 40, which is electrically connected to the temperature measurement part 33, detects the surface temperature deviation and automatically controls the supply of hydrogen gas to the user's refueling container to stop, ensuring the safety of the refueling process.

The distance measurement part 34 uses electromagnetic waves to measure the position of the user's hydrogen refueling container 2 within the refueling unit 30, thereby measuring the surface displacement according to the volume expansion of the user's hydrogen refueling container 2. The surface displacement refers to the amount of change in the position of the surface of the user's hydrogen refueling container 2 within the refueling unit 30. Preferably, the distance measurement part 34 is formed to be spaced apart from the receiving part 32 and radiates electromagnetic waves to the surface of the user's hydrogen refueling container 2 in real time while being spaced apart from the user's hydrogen refueling container 2, and more preferably, measures the surface displacement by emitting a laser to the surface of the user's hydrogen refueling container 2, calculating the time for reflection and returning, and measuring the distance. However, the above method of measuring the surface displacement of the user's hydrogen refueling container 2 by emitting electromagnetic waves or a laser is not limited to a method of measuring by emitting electromagnetic waves or a laser from the distance measurement part 34 to the surface of the user's hydrogen refueling container 2. The laser is not limited in any form as long as it corresponds to polarized light of a single wavelength. The distance measurement part 34 is electrically connected to the control unit 40 like the temperature measurement part 33.

The distance measurement part 34 may measure the temperature of hydrogen gas supplied to the user's hydrogen refueling container 2 by observing the change in volume of the user's hydrogen refueling container 2 accompanied by temperature change. To be specific, when the position of the user's hydrogen refueling container 2 observed by the distance measurement part 34 during the refueling process shows a change over a certain range compared to the position of the user's hydrogen refueling container 2 at the start of refueling, preferably, when the amount change exceeds the allowable displacement of the container preset in a straight direction, the control unit 40, which is electrically connected to the distance measurement part 34, detects the change and automatically controls the supply of hydrogen gas to the user's refueling container to stop, ensuring the safety of the refueling process.

In addition, the distance measurement part 34 may use electromagnetic waves to observe the diameter, shape, and height of the user's hydrogen refueling container 2, calculate the approximate volume of the user's hydrogen refueling container 2, and appropriately adjust the supply speed of hydrogen gas supplied to the user's hydrogen refueling container 2 on the basis of the volume value obtained in the volume calculation process. Preferably, the distance measurement part 34 is formed to be spaced apart from the receiving part 32 and radiates electromagnetic waves to each part of the surface of the user's hydrogen refueling container 2 while being spaced apart from the user's hydrogen refueling container 2, and more preferably, and calculates the approximate volume of the user's hydrogen refueling container 2 on the basis of the distance value obtained by calculating the time for reflection and return after emitting the laser to each part of the surface of the user's hydrogen refueling container 2. As described above, the laser is not limited in any form as long as it corresponds to polarized light of a single wavelength.

To be specific, when refueling starts, the distance measurement part 34 observes the diameter, shape, and height of the user's hydrogen refueling container 2 through the above-described measurement process, and the control unit 40, which is electrically connected to the distance measurement part 34, may calculate the approximate volume of the user's hydrogen refueling container 2 on the basis of the observed value, and on the basis the calculated volume value, control the supply speed of hydrogen gas supplied to the user's hydrogen refueling container 2 to be appropriately adjusted. Thus, the refueling process may be automatically performed at an appropriate refueling speed according to the characteristics of the user's hydrogen refueling container 2 without the need for the user to separately input the specifications of his or her refueling container during the refueling process. In addition, since whether the user's hydrogen refueling container 2 is accommodated in the receiving part 32 may also be confirmed on the basis the value measured by the distance measurement part 34, even if the user accidentally proceeds with the hydrogen refueling process without placing his or her hydrogen refueling container 2 in the receiving part 32, the control unit 40 detects this and prevents further progress, ensuring additional safety. Furthermore, since no separate configuration is necessary to operate the apparatus in order to respond to the characteristics of the user's hydrogen refueling container 2, miniaturization and mobility of the apparatus are facilitated.

Hereinafter, an integrated and mobile automatic hydrogen station according to another embodiment of the present disclosure will be described. In the following, only the differences due to components added in the above-described embodiment will be described, and descriptions of other common components will be omitted.

The integrated and mobile automatic hydrogen station according to another embodiment of the present disclosure may further include: a water electrolysis unit 50 including a water electrolysis equipment 51 that receives H2O from the outside and receives power generated from an internal generator (not shown) or from outside, and electrolyzes the water to produce hydrogen gas in addition to the hydrogen pressurizing unit 10, cooling unit 20, refueling unit 30, and control unit 40. Hydrogen gas produced in the water electrolysis equipment 51 may be guided to the hydrogen guide line 131 through a separate guide line connected to the hydrogen guide line 131. Thereafter, the process of compressing the produced hydrogen gas and supplying the compressed hydrogen gas to the user is the same as described in the above-described embodiment. The water electrolysis unit 50 allows hydrogen gas to be produced and supplied independently even at hydrogen mobility operation sites where it is difficult to bring in hydrogen gas. Therefore, even if only a certain amount of water, which is easy to procure in general sites, is supplied, hydrogen gas may be refueled to hydrogen mobility that requires hydrogen gas. As an example, in sites that do not meet the safety standards required for installing compressed hydrogen gas storage containers, the above refueling process may be performed using hydrogen gas produced by the water electrolysis unit 50 according to another embodiment of the present disclosure without any additional measures.

An integrated and mobile automatic hydrogen station according to still another embodiment of the present disclosure may further include: a hydrogen storage tank unit 60 including a hydrogen storage tank 61 that separately stores compressed hydrogen gas produced externally or in-house in addition to the hydrogen pressurizing unit 10, cooling unit 20, refueling unit 30, and control unit 40. A temperature sensor or pressure sensor is provided in the hydrogen storage tank 61 to measure the temperature or pressure of the compressed hydrogen gas in the hydrogen storage tank 61. Preferably, the hydrogen gas stored in the hydrogen storage tank 61 may be guided to the hydrogen guide line 131 through a separate guide line 62 connected to the hydrogen guide line 131 when the refueling process is performed, and the separate guide line 62 connected to the hydrogen guide line 131 in the hydrogen storage tank 61 is provided with a solenoid valve 143 connected to the control unit 40 on the guide path, so that control unit 40 may automatically control the supply of the compressed hydrogen gas stored in the hydrogen storage tank 61. Thereafter, the process of compressing the produced hydrogen gas and supplying the compressed hydrogen gas to the user is the same as described in the above-described embodiment. The hydrogen storage tank unit 60 allows hydrogen gas to be easily supplied at a site that may meet the safety standards required when providing a compressed hydrogen gas storage container. Therefore, the hydrogen refueling process using the hydrogen station 1 according to the present disclosure may be performed flexibly according to field conditions.

In the above, the applicant has described various embodiments of the present disclosure, but these embodiments are only examples that implement the technical idea of the present disclosure, and any changes or modifications should be construed as falling within the scope of the present disclosure as long as such changes or modifications embody the technical idea of the present disclosure.

In addition, among the matters described in the description of the present disclosure, the configuration of the motorized valve and the solenoid valve and the coupling relationship with other configurations are only examples. As long as the valve corresponds to a valve that is electrically connected to a control means to control whether the valve is open or closed and the degree of opening or closing and implements the same technical idea as that of the present disclosure, any changes or modifications should be construed as falling within the scope of the present disclosure. Among the matters described in the description of the present disclosure, the configuration of the ball valve and the needle valve and the coupling relationship with other configurations are only examples. As long as the valve corresponds to a valve that is electrically connected to a control means to control whether the valve is open or closed and the degree of opening or closing and implements the same technical idea as that of the present disclosure, any changes or modifications should be construed as falling within the scope of the present disclosure.

The invention claimed is:

1. An integrated and mobile automatic hydrogen station, comprising:

a hydrogen pressurizing unit including a gas guide line, a gas booster, and a buffer tank, and configured to compress and accommodate hydrogen gas, wherein the buffer tank is disposed on a path through which the hydrogen gas is discharged from the gas booster;

a cooling unit including a cooling water tank, and configured to cool the hydrogen gas;

a refueling unit including a receiving part configured to accommodate a hydrogen refueling container of a user and a distance measurement part, and configured to receive the hydrogen gas from the hydrogen pressurizing unit and provide the hydrogen gas received to a user; and a control unit configured to control a hydrogen refueling process in the hydrogen pressurizing unit, the cooling unit, and the refueling unit, wherein the gas guide line includes an air guide line, a hydrogen guide line, and a nitrogen guide line, wherein the receiving part includes a receiving guide line, and the receiving guide line includes a ball valve and a solenoid valve, both electrically connected to a control unit, wherein a motorized valve and a pressure sensor electrically connected to the control unit are provided on the hydrogen guide line and the nitrogen guide line, wherein an opening and closing of the motorized valve is controlled based on a pressure value on the hydrogen guide line and the nitrogen guide line, wherein the nitrogen guide line further comprises a pressure relief valve to allow excess nitrogen gas to be discharged through a separate guide path when a gas pressure value of the nitrogen guide line exceeds a predetermined reference value, wherein the distance measurement part is disposed to be spaced apart from the receiving part and configured to radiate electromagnetic waves to a surface of the hydrogen refueling container, calculate a time for reflection and returning, measure a surface displacement to observe a diameter, shape, and height of the hydrogen refueling container, and calculate an approximate volume of the hydrogen refueling container, wherein the control unit is configured to control a supply speed of the hydrogen gas supplied to the hydrogen refueling container based on a value of the approximate volume, wherein the control unit is configured to detect whether the hydrogen refueling container is accommodated in the receiving part based on the value measured by the distance measurement part, and prevent the hydrogen refueling process without placing the hydrogen refueling container in the receiving part.

2. The integrated and mobile automatic hydrogen station of claim 1, wherein the hydrogen guide line is configured to receive the hydrogen gas from an outside, guide the hydrogen gas to the gas booster, and direct the hydrogen gas compressed in the gas booster to the refueling unit.

3. The integrated and mobile automatic hydrogen station of claim 1, wherein the nitrogen guide line is configured to guide a nitrogen gas to the gas booster.

4. The integrated and mobile automatic hydrogen station of claim 1, wherein a boosting speed of the gas booster depends on an amount of air supplied from the air guide line to the gas booster.

5. The integrated and mobile automatic hydrogen station of claim 1, wherein a hydrogen refueling speed depends on an amount of air supplied from the air guide line to the gas booster.

6. The integrated and mobile automatic hydrogen station of claim 1, wherein the buffer tank is configured to store a high-pressure hydrogen gas and discharge the high-pressure hydrogen gas to the refueling unit.

7. The integrated and mobile automatic hydrogen station of claim 1, wherein the hydrogen guide line includes a backflow preventer disposed in a path leading to the gas booster, and the backflow preventer is configured to prevent a high-pressure hydrogen gas compressed in the gas booster from flowing back into the hydrogen guide line.

8. The integrated and mobile automatic hydrogen station of claim 1, wherein each of the receiving part includes a receiving guide line, and each of the receiving guide line includes a ball valve and a solenoid valve.

* * * * *